United States Patent
Wagger (10) Patent No.: US 8,579,057 B2
(45) Date of Patent: Nov. 12, 2013

(54) SNOW GROOMER AND RELATIVE CONTROL METHOD

(75) Inventor: Klaus Wagger, Brunico (IT)

(73) Assignee: Snowgrolic S.AR.L., Luxembourg (LU)

( * ) Notice: Subject to any disclaimer, the term of this patent is extended or adjusted under 35 U.S.C. 154(b) by 0 days.

(21) Appl. No.: 13/513,074

(22) PCT Filed: Nov. 30, 2010

(86) PCT No.: PCT/IB2010/003063
§ 371 (c)(1),
(2), (4) Date: Aug. 7, 2012

(87) PCT Pub. No.: WO2011/067652
PCT Pub. Date: Jun. 9, 2011

(65) Prior Publication Data
US 2012/0305321 A1 Dec. 6, 2012

(30) Foreign Application Priority Data
Dec. 2, 2009 (IT) ............................. MI2009A2133

(51) Int. Cl.
*B62D 55/065* (2006.01)
(52) U.S. Cl.
USPC .......................................... 180/9.46; 180/9.6
(58) Field of Classification Search
USPC ............ 180/9.46, 9.56, 9.6; 305/144; 701/37
See application file for complete search history.

(56) References Cited

U.S. PATENT DOCUMENTS

| | | | | |
|---|---|---|---|---|
| 3,447,621 A * | 6/1969 | Schoonover | ................. | 180/9.52 |
| 4,029,165 A * | 6/1977 | Miller et al. | ................. | 180/6.48 |
| 4,681,177 A * | 7/1987 | Zborowski | ................. | 180/9.56 |
| 5,409,075 A * | 4/1995 | Nieman | ................. | 180/9.5 |
| 5,794,731 A * | 8/1998 | Klaus | ................. | 180/9.56 |
| 5,927,412 A * | 7/1999 | Crabb | ................. | 180/9.44 |
| 6,247,547 B1 * | 6/2001 | Lemke et al. | ................. | 180/9.5 |
| 6,832,659 B1 * | 12/2004 | Bares et al. | ................. | 180/9.22 |
| 7,740,094 B2 * | 6/2010 | Pelletier | ................. | 180/184 |
| 7,967,087 B2 * | 6/2011 | Arulraja et al. | ................. | 180/9.5 |
| 2013/0119754 A1 * | 5/2013 | Allaire | ................. | 305/144 |

FOREIGN PATENT DOCUMENTS

| | | |
|---|---|---|
| EP | 1 995 159 | 11/2008 |
| JP | 4334677 | 11/1992 |
| JP | 10-95373 | 4/1998 |
| NL | 9201553 | 4/1994 |
| RU | 2 041 080 | 8/1995 |

OTHER PUBLICATIONS

PCT Request (Form PCT/RO/101) for International Application No. PCT/IB2010/003063 dated Nov. 30, 2010.

(Continued)

*Primary Examiner* — Tony Winner
(74) *Attorney, Agent, or Firm* — Neal, Gerber & Eisenberg LLP (57) ABSTRACT

A ski slope snow groomer having a frame; two wheel assemblies on opposite sides of the frame; two tracks wound respectively about the two wheel assemblies; a variable-configuration shock absorber assembly connected to the wheel assemblies and the frame and configured to adjust the wheel assemblies; and a control assembly configured to acquire a signal indicating an operating state of the snow groomer, and to adjust the shock absorber assembly as a function of the operating state signal.

10 Claims, 5 Drawing Sheets

(56) References Cited

OTHER PUBLICATIONS

Notification Concerning Submission, Obtention or Transmittal of Priority Document (Form PCT/IB/304) for International Application No. PCT/IB2010/003063 dated Feb. 17, 2011.

International Search Report and Written Opinion for International Application No. PCT/IB2010/003063 dated Apr. 13, 2011.

First Notice Informing the Applicant of the Communication of the International Application (Form PCT/IB/308) for International Application No. PCT/IB2010/003063 dated Jul. 7, 2011.

Second and Supplementary Notice Informing the Applicant of the Communication of the International Application (Form PCT/IB/308) for International Application No. PCT/IB2010/003063 dated Apr. 5, 2012.

PCT Demand (Form PCT/IPEA/401) and the Reply to Written Opinion for International Application No. PCT/IB2010/003063 dated Oct. 3, 2011.

Notification of Receipt of Demand by Competent International Preliminary Examining Authority (Form PCT/IPEA/402) for International Application No. PCT/IB2010/003063 dated Nov. 18, 2011.

Written Opinion of International Preliminary Examining Authority for International Application No. PCT/IB2010/003063 dated Dec. 20, 2011 and the Reply dated Jan. 11, 2012.

International Preliminary Report on Patentability with enclosures for International Application No. PCT/IB2010/003063 dated Jan. 19, 2012.

* cited by examiner

SNOW GROOMER AND RELATIVE CONTROL METHOD

PRIORITY CLAIM

This application is a national stage application of PCT/IB2010/003063, filed on Nov. 30, 2010, which claims the benefit of and priority to Italian Patent Application No. MI2009A 002133, filed on Dec. 2, 2009, the entire contents of which are each incorporated by reference herein.

BACKGROUND

A snow groomer is known from French Patent Application No. 2,649,950, in which a shock absorber assembly is connected to, and configured to adjust the configuration of, the wheel assemblies. In other words, the driver of the groomer controls the hydraulic assembly directly to adjust the configuration of the groomer between two operating positions.

Snow groomers are normally equipped with various implements, such as a tiller configured to till the snow cover of ski slopes; a shovel configured to move masses of snow along ski slopes; and possibly also a winch assembly, when working on very steep slopes. In the latter case, the free end of the winch assembly cable is fixed to an anchoring point uphill to maneuver the groomer more safely with the aid of the winch assembly, and prevent the groomer from slipping, in the event of loss of traction on the snow cover.

The total weight of the groomer and the pressure exerted on the snow cover vary, depending on the type and number of implements fitted to the groomer.

In European Patent Application No. 1,995,159, the groomer is equipped with an actuating assembly configured to adjust the configuration of the wheel assemblies to spread the total weight between the wheels using a driver command in response to wheel load values.

Certain snow groomers have proved highly effective in controlling the configuration of the wheel assemblies, but, by forcing the driver to monitor the wheel assembly situation, distract the driver from actually driving the vehicle. In this connection, it is important to remember that snow groomers are mainly operated at night, on steep, hazardous slopes, and at times in severe weather conditions, all of which require the driver's full attention to driving the vehicle, to avoid hazardous situations.

Netherlands Patent Document No. 9201553 discloses a tracked vehicle, wherein the height of the vehicle is adapted as a function of the traveling speed of the vehicle and the position of the steering wheel.

However, the system disclosed in Netherlands Patent Document No. 9201553 is unable to better define the operating state of a snow groomer, which varies, depending on the implements it is equipped with, the operating conditions of the implements, the type of route, and travelling conditions.

Known snow groomers do not permit integrated control of these operating parameters.

SUMMARY

The present disclosure relates to a ski slope snow groomer.

More specifically, the present disclosure relates to a snow groomer comprising a frame; two wheel assemblies on opposite sides of the frame; and two tracks wound respectively about the wheel assemblies.

It is an advantage of the present disclosure to provide a snow groomer configured to eliminate certain of the drawbacks of certain known snow groomers.

Another advantage of the present disclosure is to provide a snow groomer configured to improve driver comfort in all operating conditions, as well as performance of the groomer itself.

According to one embodiment of the present disclosure, there is provided a ski slope snow groomer comprising:
a frame;
two wheel assemblies on opposite sides of the frame;
two tracks wound respectively about the two wheel assemblies;
a variable-configuration and variable rigidity shock absorber assembly connected to the wheel assemblies and the frame, and configured to adjust the wheel assemblies; and
a control assembly comprising a plurality of sensors including a speed sensor configured to acquire a signal indicating the travelling speed of the snow groomer; a sensor configured to acquire a signal indicating the steering angle of the snow groomer; and at least one sensor selected from pressure sensors configured to acquire signals correlated to the rigidity of shock absorber assembly, an inclinometer configured to acquire a signal indicating lateral tilt of the snow groomer, and an inclinometer configured to acquire a signal indicating longitudinal tilt of the snow groomer; the control unit being configured to calculate an operating state signal as a function of a plurality of signals including the speed signal; the angle signal; and at least one signal selected from the signals of the pressure sensors, the lateral tilt signal, and the longitudinal tilt signal, and to adjust the shock absorber assembly as a function of the operating state signal.

The control assembly thus adapts the shock absorber assembly automatically as a function of the operating state of the groomer, thus allowing the driver to concentrate fully on driving the groomer.

Another advantage of the present disclosure is to provide a method of controlling a snow groomer, configured to eliminate certain of the drawbacks of certain known snow groomers.

According to one embodiment of the present disclosure, there is provided a method of controlling a ski slope snow groomer, the snow groomer comprising:
a frame;
two variable-configuration wheel assemblies on opposite sides of the frame; and
two tracks wound respectively about the two wheel assemblies;
the method comprising the steps of:
adjusting the wheel assemblies using a variable-configuration shock absorber assembly connected to the wheel assemblies and the frame;
acquiring a plurality of signals including a signal indicating the travelling speed of the snow groomer; a signal indicating the steering angle of the snow groomer; and at least one signal selected from signals indicating the operating pressures of the shock absorber devices, a signal indicating lateral tilt of the snow groomer, a signal indicating longitudinal tilt of the snow groomer;
calculating an operating state signal of the snow groomer as a function of a plurality of signals including the speed signal, the angle signal, and at least one signal selected form the signals indicating the operating pressure, the lateral tilt signal, and the longitudinal tilt signal; and
adjusting the shock absorber assembly as a function of the operating state signal.

In one embodiment of the present disclosure, the method comprises acquiring a signal indicating an operator command; and recalculating the operating state signal as a function of the operator command signal.

The operating state can thus take driver preference into account.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
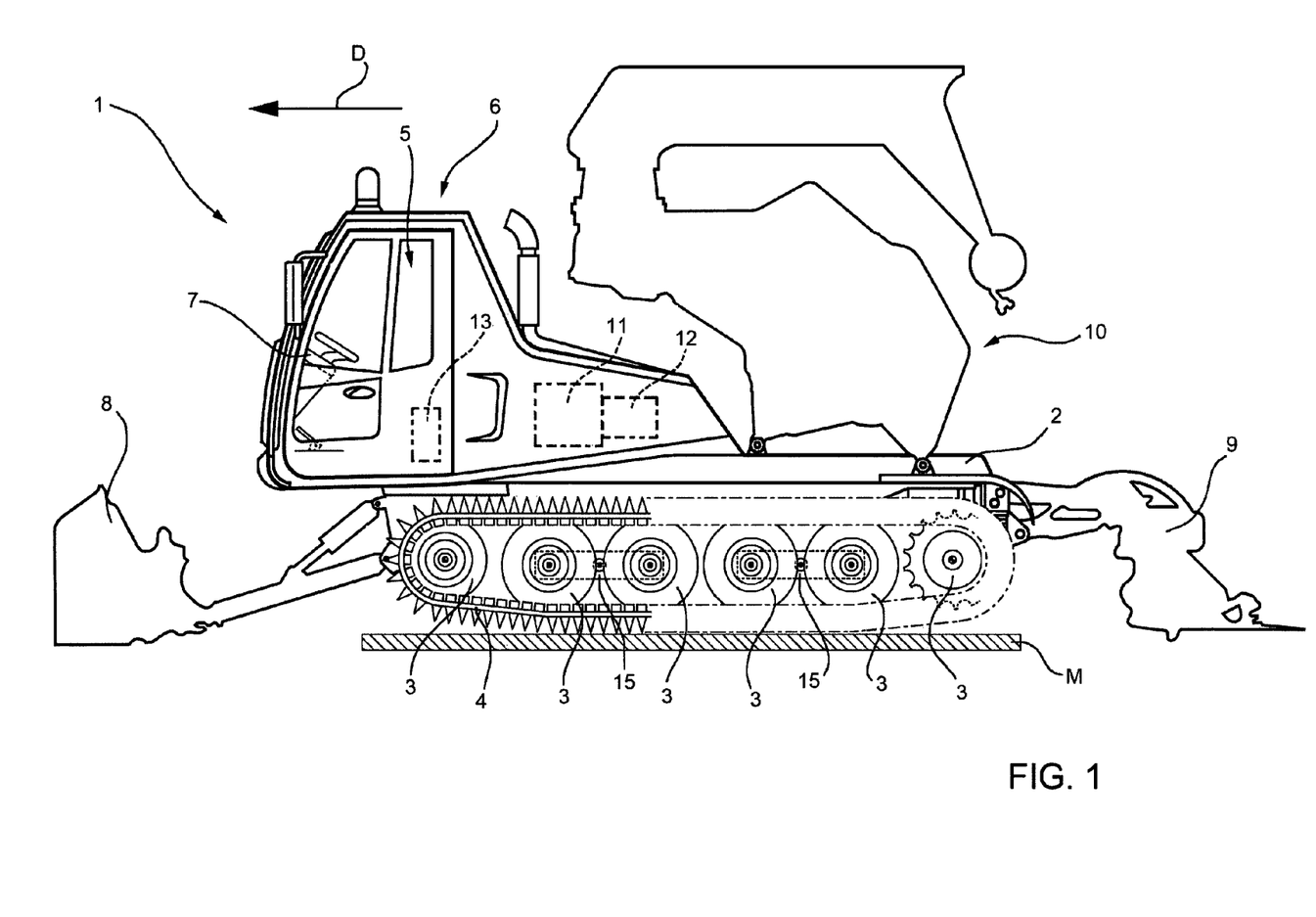
FIG. 1 shows a side view, with parts removed for clarity, of a snow groomer in accordance with the present disclosure and in a first operating position.

Referring now to the example embodiments of the present disclosure illustrated in FIGS. 1 to 5, number 1 in FIG. 1 indicates as a whole a ski slope snow groomer configured to travel in a travelling direction D.

Figure 3:
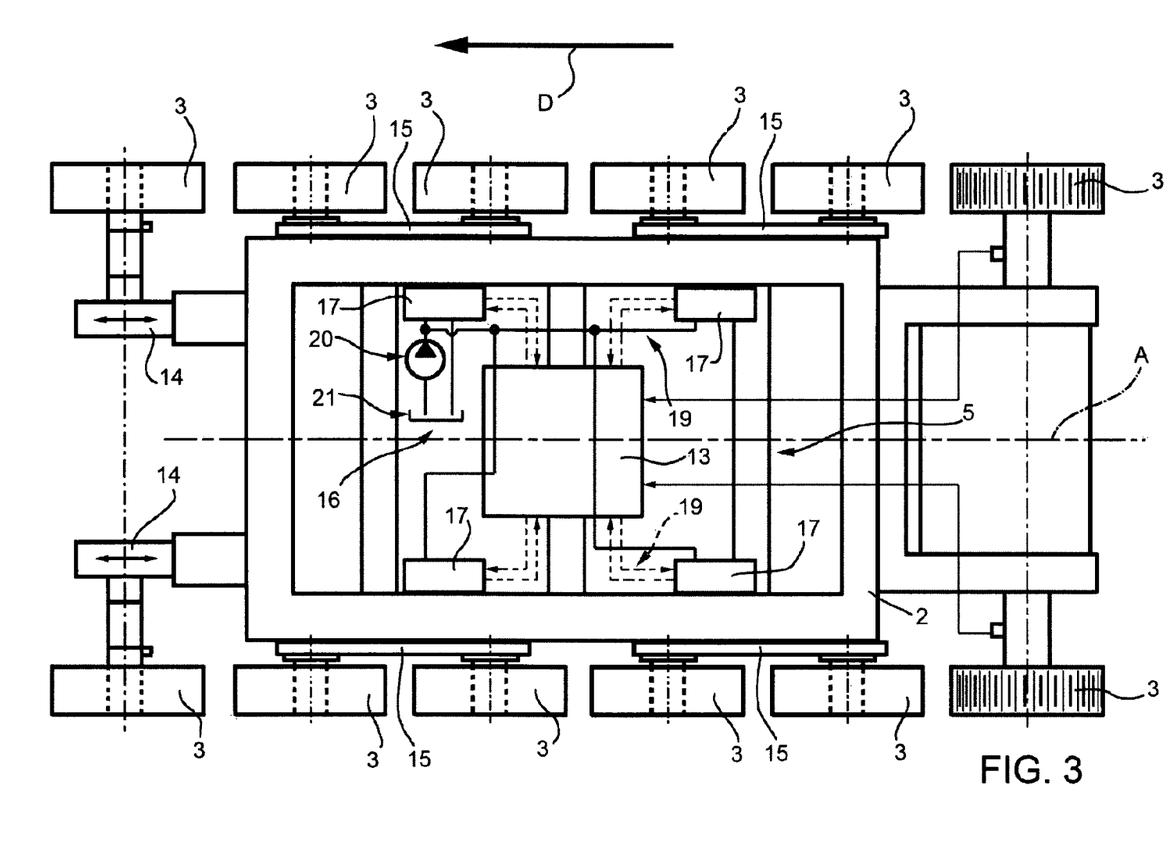
FIG. 3 shows a schematic plan view, with parts removed for clarity, of a detail of the FIG. 1 snow groomer.

As shown more clearly in FIG. 3, snow groomer 1 comprises a frame 2; two variable-configuration wheel assemblies 3 on opposite sides of frame 2; and two tracks 4 wound about respective wheel assemblies 3 (only one of which is shown in FIG. 1).

Each wheel assembly 3 comprises a front wheel 3; a rear wheel 3; and four middle wheels 3 between front wheel 3 and rear wheel 3, which is a drive wheel.

With reference to FIG. 1, snow groomer 1 comprises a control assembly 5; a cab 6; a user interface 7 inside cab 6; a shovel 8 fitted to the front of frame 2; a tiller 9 fitted to the rear of frame 2; a winch assembly 10 fitted to the top of frame 2; an internal combustion engine 11; and a power train 12 connected functionally to internal combustion engine 11, drive wheels 3, shovel 8, tiller 9, and winch assembly 10. Power train 12 may be hydraulic or electric, or a combination of the two.

Control assembly 5 comprises a control unit 13 and user interface 7, and is configured to acquire a signal indicating an operating state of snow groomer 1 as a function of at least one operating parameter, and in at least one embodiment, a plurality of operating parameters, of the snow groomer, and to adjust the configuration of wheel assemblies 3 as a function of the operating state signal.

In FIG. 1, only one portion of each track 4 contacts the snow cover M, and the portions of track 4 at end wheels 3 are raised off snow cover M.

Figure 2:
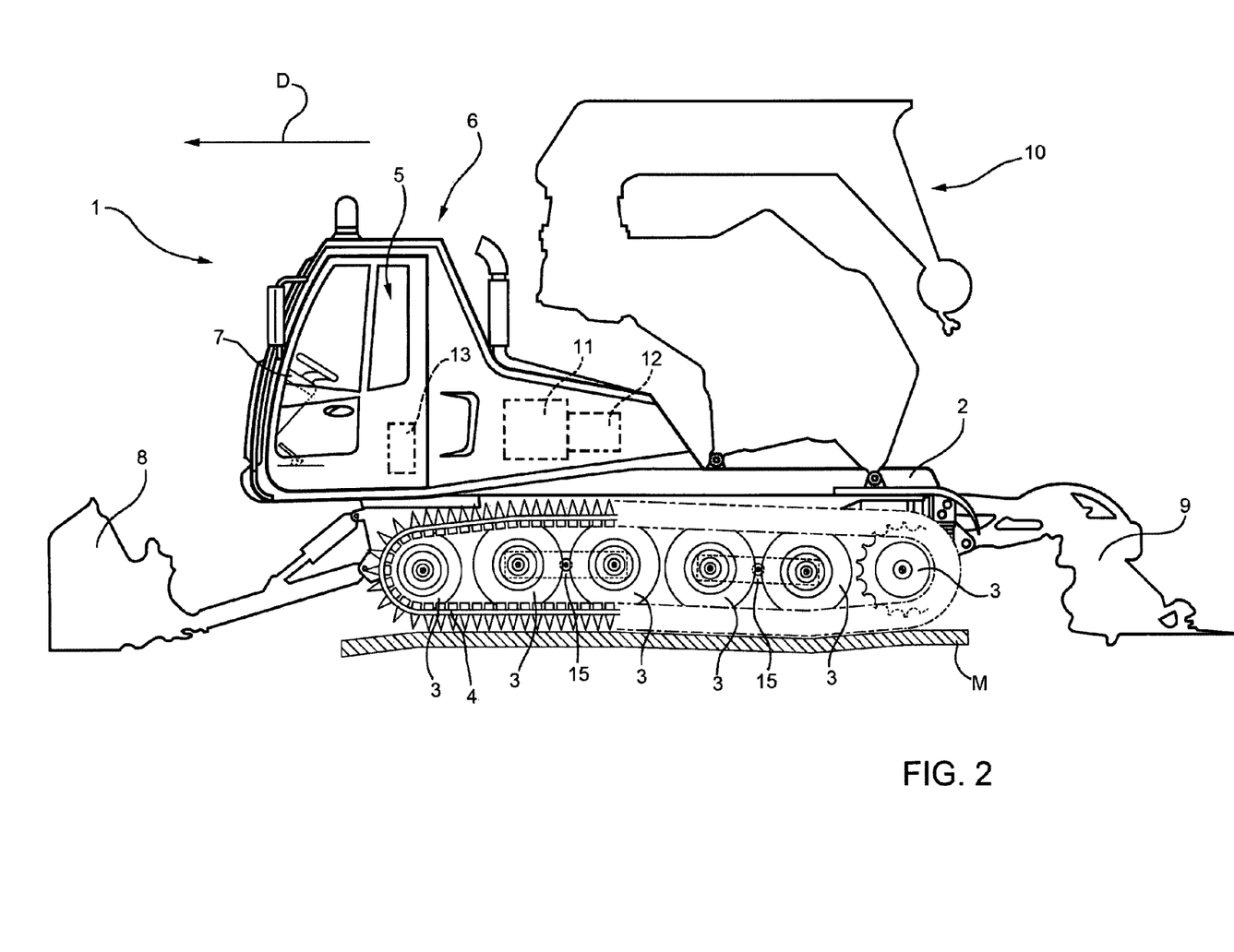
FIG. 2 shows a side view, with parts removed for clarity, of a snow groomer in accordance with the present disclosure and in a second operating position.

In FIG. 2, the contact surface of each track 4 also extends to end wheels 3.

The configuration of tracks 4 depends on the configuration of respective wheel assemblies 3, each of which is adjustable between two limit configurations.

With reference to FIG. 3, frame 2 extends along an axis A, and supports wheel assemblies 3. In the example shown, each front wheel 3 is connected to frame 2 by a carriage 14 fitted to frame 2, and which is movable, by an actuator (not shown), along axis A to keep respective track 4 taut regardless of the configuration of the other wheels 3 in wheel assembly 3. Rear wheels 3 are fitted directly to frame 2.

The middle wheels 3 in each assembly are connected in pairs to respective rocker arms 15, in turn connected movably to frame 2.

Snow groomer 1 comprises a variable-configuration, variable-rigidity shock absorber assembly 16 configured to connect middle wheels 3—in this case, rocker arms 15—to frame 2, absorbing any shock, and selectively adjusting the position of middle wheels 3 with respect to frame 2.

In the FIG. 3 example, shock absorber assembly 16 comprises four shock absorber devices 17, each connecting a respective rocker arm 15 to frame 2. In another embodiment (not shown in the drawings), each middle wheel 3 is associated with a respective shock absorber device 17.

Control assembly 5 is configured to control shock absorber assembly 16, which adjusts the configuration of wheel assemblies 3 using shock absorber devices 17.

In the example shown, shock absorber assembly 16 is controlled hydraulically to adjust the configuration of wheel assemblies 3 and the rigidity of each shock absorber device 17.

Control assembly 5 is configured to adjust shock absorber devices 17 independently or jointly. In the case of joint adjustment, this means at least two shock absorber devices 17 are adjusted to the same position and the same rigidity.

Shock absorber devices 17 can be adjusted jointly in various combinations. Various commonly used options are those jointly operating shock absorber devices 17 associated with opposite rocker arms 15 on either side of axis A, or only one pair of shock absorber devices associated with opposite rocker arms.

A hydraulic circuit 19 comprises a pump 20; a tank 21; and lines connecting pump 20 and tank 21 to each shock absorber device 17.

Figure 4:
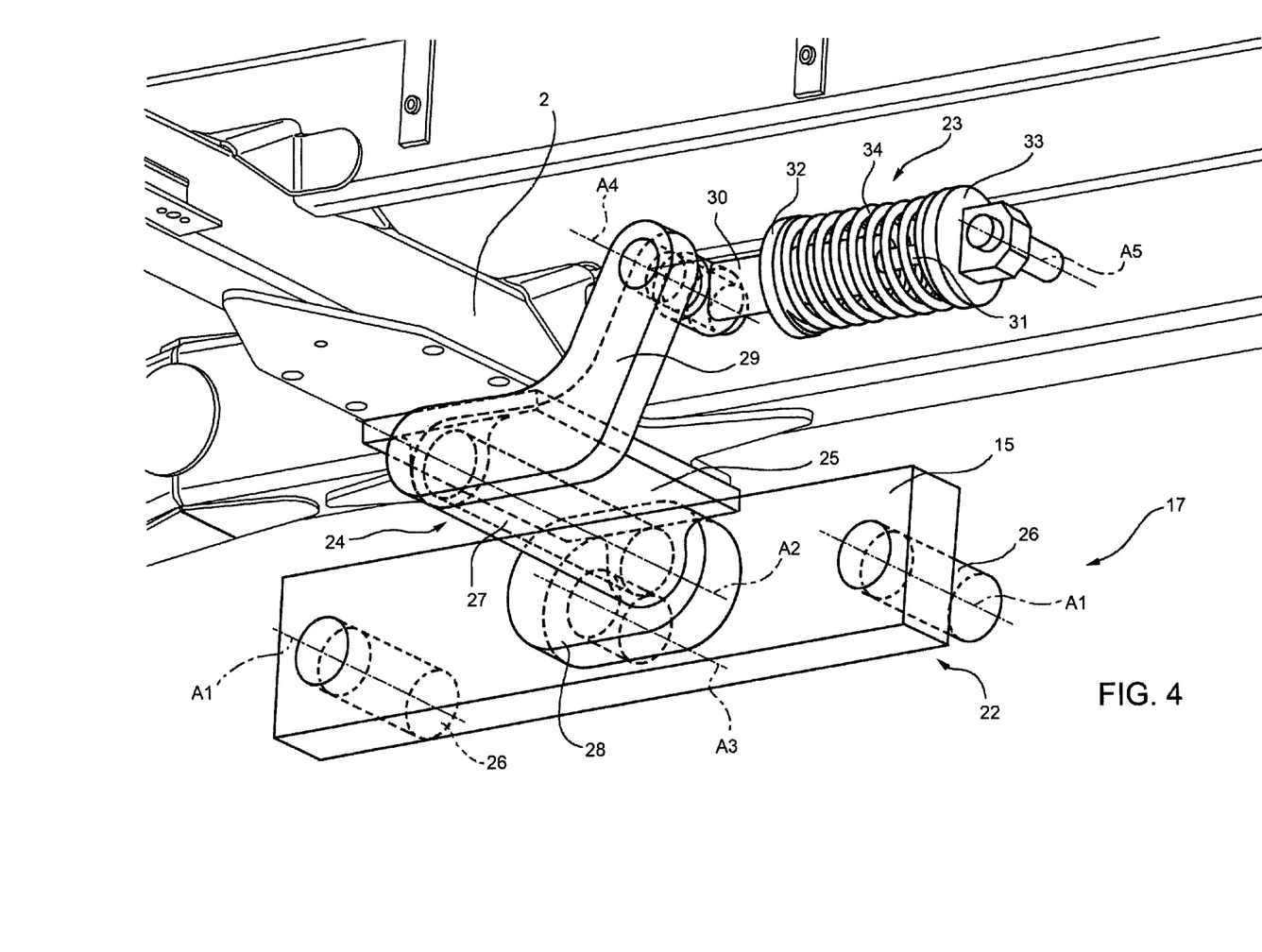
FIG. 4 shows a larger-scale view in perspective, with parts removed for clarity, of a detail of the FIG. 1 snow groomer.

With reference to FIG. 4, each shock absorber device 17 comprises a mechanical connection 22 between frame 2 and rocker arm 15 and a portion of hydraulic circuit 19. Mechanical connection 22 comprises a hydraulic cylinder 23; a crank 24; and a supporting plate 25 supporting crank 24. Rocker arm 15 comprises two mounts 26 configured to attach respective middle wheels 3 about two axes of rotation A1 crosswise to axis A (FIG. 1). Crank 24 comprises a shaft 27, which has an axis A2 parallel to axes A1, and is mounted to rotate about axis A2 inside supporting plate 25 fixed to frame 2; an arm 28 connected rigidly to shaft 27, and connected to rocker arm 15 to rotate about an axis A3 parallel to and equidistant from axes A1; and an arm 29 integral with shaft 27 and fitted to one end of hydraulic cylinder 23 to rotate about an axis A4 parallel to axes A1.

The other end of hydraulic cylinder 23 is fixed to frame 2 to rotate about an axis A5 parallel to axes A1. By adjusting the length of hydraulic cylinder 23, it is therefore possible to adjust the distance between rocker arm 15, or rather axis A2, and frame 2, because rocker arm 15 is able to oscillate freely about axis A2 and so adjust the position of respective middle wheels 3 with respect to frame 2.

Hydraulic cylinder 23 is a double-acting hydraulic cylinder, and comprises a cylinder 30; a rod 31; a plate 32 integral with cylinder 30; a plate 33 integral with rod 31; and an elastic member 34—in the example shown, a spring—precompressed between plates 32 and 33.

Figure 5:
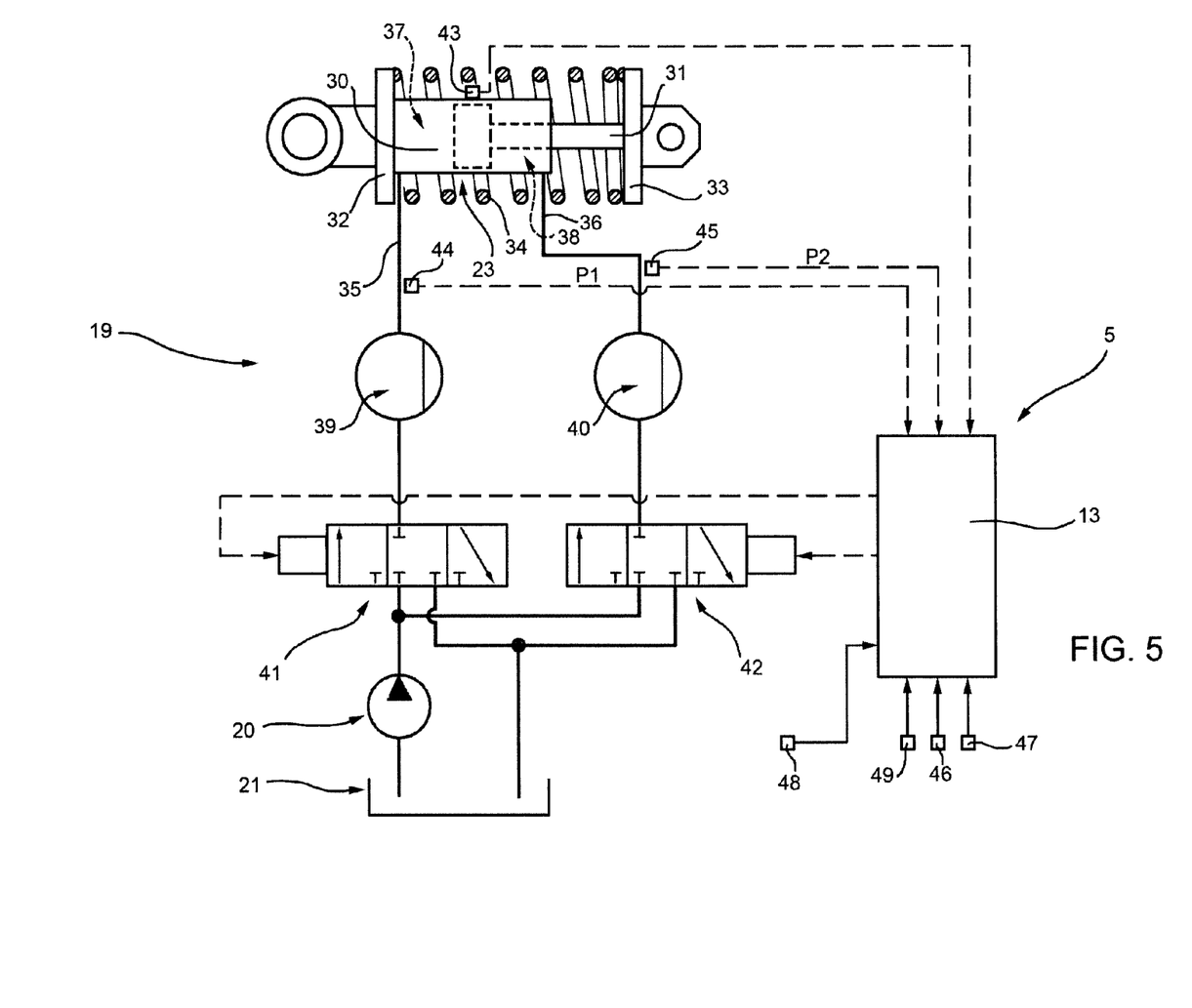
FIG. 5 shows a schematic, with parts removed for clarity, of a control assembly of the FIG. 1 snow groomer.

With reference to FIG. 5, hydraulic cylinder 23 is connected to two branches 35, 36 of hydraulic circuit 19 to selectively fill and drain a first and second chamber 37, 38 of hydraulic cylinder 23. Shock absorber device 17 also comprises two expansion vessels 39, 40 of the hydraulic cylinder, located along respective branches 35, 36; and two servovalves 41, 42 also located along respective branches 35, 36.

Each expansion vessel 39, 40 may be of the type divided internally by a membrane into two compartments, one containing air or other gas, and the other containing substantially non-compressible hydraulic fluid. Depending on the amount of hydraulic fluid in the compartment, it is thus possible to set hydraulic cylinder 23 to a position of equilibrium and adjust the rigidity of hydraulic cylinder 23, which operates as a shock absorber.

Servovalves 41, 42 are both three-way, three-position servovalves configured to selectively supply, drain, and cut off hydraulic fluid flow of respective chambers 37, 38, and are selectively controlled by control assembly 5.

In one embodiment of the present disclosure, control assembly 5 comprises position sensors 43, each associated with a respective hydraulic cylinder 23 to determine the position of hydraulic cylinder 23 and emit a signal indicating the position of shock absorber device 17 with respect to frame 2. And control unit 13 calculates a signal indicating the configuration of shock absorber assembly 16 as a function of the signals indicating the position of shock absorber devices 17 (FIG. 3).

In another embodiment of the present disclosure, control assembly 5 comprises, for each shock absorber device 17, a pressure sensor 44 configured to determine the pressure P1 in chamber 37; and a pressure sensor 45 configured to determine the pressure P2 in chamber 38. And control unit 13 acquires the pressure signals from sensors 44 and sensors 45, and accordingly calculates a signal indicating the rigidity of each shock absorber device, and a signal indicating the rigidity of shock absorber assembly 16.

In one embodiment of the present disclosure, control assembly 5 comprises a speed sensor 46 configured to determine the travelling speed of snow groomer 1, and emit a speed signal.

In one embodiment, control assembly 5 comprises a sensor 47 configured to determine the steering angle of snow groomer 1, and emit a signal indicating the steering angle.

In one embodiment of the present disclosure, control assembly 5 comprises an inclinometer 48 configured to determine lateral tilt of snow groomer 1, and emit a signal indicating the lateral tilt of snow groomer 1.

In one embodiment of the present disclosure, control assembly 5 comprises an inclinometer 49 configured to determine longitudinal tilt of snow groomer 1, and emit a signal indicating the longitudinal tilt of snow groomer 1.

Control unit 13 acquires the signal indicating the configuration of shock absorber assembly 16, the signal indicating the rigidity of shock absorber assembly 16, the signal indicating the speed of snow groomer 1, the steering angle signal, the signal indicating lateral tilt of snow groomer 1, and the signal indicating longitudinal tilt of snow groomer 1, and accordingly calculates a signal indicating the operating state of snow groomer 1. In other words, the operating state of snow groomer 1 is a function of a plurality of operating parameters.

In alternative embodiments, the control unit calculates the operating state signal as a function of one or more of the above signals from the control unit.

When the operating state signal is a function of more than one signal, control unit 13 compares the signals with threshold values, rates the signals on the basis of priority, and calculates the operating state signal by eliminating any low-priority signals or by assigning different weights to the signals.

User interface 7 is configured to emit a control signal, and control unit 13 is configured to recalculate the operating state signal as a function of the control signal. In other words, the driver of snow groomer 1 is permitted to personally select given attitudes of snow groomer 1; and the operating state signal is recalculated as a function of the driver-selected attitude. The attitude of snow groomer 1 is a combination of the configuration of wheel assemblies 3, (i.e., of shock absorber assembly 16), and the rigidity of shock absorber 16.

After calculating the signal indicating the operating state of snow groomer 1, control unit 13 adjusts shock absorber assembly 16 accordingly.

For example, each wheel assembly 3 assumes a configuration enabling maximum contact between tracks 4 and snow cover M at very high speed.

In the event of severe lateral tilt, wheel assemblies 3 assume respective asymmetrical configurations to compensate for it.

In the event of severe longitudinal tilt, each wheel assembly 3 assumes a configuration configured to reduce it.

When steering, the contact area between tracks 4 and the snow cover is reduced as a function of the steering angle.

User interface 7 in FIG. 1 allows the driver to override automatic adjustment of shock absorber assembly 16 and adjust it manually.

The driver of snow groomer 1 can also opt to jointly operate two or more shock absorber devices 17, (i.e., with the same position and rigidity parameters), or to operate shock absorber devices 17 independently or in independent groups.

In manual mode, the driver controls both the position and rigidity of shock absorber assembly 16 with the aid of a display, on user interface 7, showing the data supplied by sensors 43, 44, 45 relative to the actual position and rigidity of shock absorber assembly 16.

The present disclosure also extends to embodiments not covered in the above detailed description, as well as equivalent embodiments within the protective scope of the accompanying Claims. It should thus be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A ski slope snow groomer comprising:
a frame;
two wheel assemblies on opposite sides of the frame;
two tracks wound respectively about the two wheel assemblies;
a variable-configuration and variable rigidity shock absorber assembly connected to the wheel assemblies and the frame and configured to adjust the wheel assemblies; and
a control assembly including:
a plurality of sensors including:
a speed sensor configured to acquire a signal indicating a travelling speed of the ski slope snow groomer,
a sensor configured to acquire a signal indicating a steering angle of the ski slope snow groomer, and at least one sensor selected from the group consisting of: a plurality of pressure sensors configured to acquire signals correlated to a rigidity of the shock absorber assembly, an inclinometer configured to acquire a signal indicating a lateral tilt of the ski slope snow groomer, and an inclinometer configured to acquire a signal indicating a longitudinal tilt of the ski slope snow groomer; and a control unit configured to:
calculate an operating state signal as a function of a plurality of the signals at least including the traveling speed signal, the steering angle signal, and at least one signal selected from the group consisting of: the signals of the pressure sensors, the lateral tilt signal, and the longitudinal tilt signal, and
cause an adjustment of the shock absorber assembly as a function of the calculated operating state signal.

2. The ski slope snow groomer of claim 1, wherein the control assembly includes at least one position sensor configured to acquire a signal indicating a configuration of the shock absorber assembly, and the control unit is configured to calculate the signal indicating the operating state of the ski slope snow groomer as a function of the signal of the at least one position sensor.

3. The ski slope snow groomer of claim 1, wherein:
the control assembly includes a plurality of position sensors,
the shock absorber assembly includes a plurality of shock absorber devices, each shock absorber device is connected to at least one wheel and the frame and each shock absorber device is associated with at least one of the position sensors to acquire a signal indicating the position of the respective shock absorber device, and
the control unit is configured to calculate the signal indicating a configuration of the shock absorber assembly as a function of the signals indicating the positions of the shock absorber devices.

4. The ski slope snow groomer of claim 3, wherein:
the control assembly includes a plurality of pressure sensors associated with the shock absorber devices,
the control assembly is configured to acquire signals indicating a plurality of operating pressures of the shock absorber devices, and
the control unit is configured to calculate the rigidity of the shock absorber assembly as a function of the signals indicating the operating pressures of the shock absorber devices.

5. The ski slope snow groomer of claim 1, wherein the control assembly includes a user interface configured to supply a signal indicating an operator command and the control unit is configured to recalculate the operating state signal as a function of the operator command signal.

6. A method of controlling a ski slope snow groomer including a frame, two variable-configuration wheel assemblies on opposite sides of the frame, and two tracks wound respectively about the two wheel assemblies, the method comprising:
acquiring a plurality of signals including:
a signal indicating a travelling speed of the ski slope snow groomer,
a signal indicating a steering angle of the ski slope snow groomer, and
at least one signal selected from the group consisting of: signals indicating a plurality of operating pressures of a plurality of shock absorber devices, a signal indicating a lateral tilt of the ski slope snow groomer, and a signal indicating a longitudinal tilt of the ski slope snow groomer;
calculating an operating state signal of the ski slope snow groomer as a function of a plurality of the signals including the travelling speed signal, the steering angle signal, and at least one signal selected from the group consisting of: signals indicating the operating pressures, the lateral tilt signal, and the longitudinal tilt signal; and
using a variable-configuration shock absorber assembly connected to the wheel assemblies and the frame to adjust the wheel assemblies as a function of the operating state signal.

7. The method of claim 6, which includes:
acquiring a signal indicating a configuration of the shock absorber assembly, and
calculating the signal indicating the operating state of the ski slope snow groomer as a function of the signal indicating the configuration of the shock absorber assembly.

8. The method of claim 6, wherein the shock absorber assembly is of variable rigidity and the method includes:
acquiring a signal indicating a rigidity of the shock absorber assembly,
calculating the operating state signal as a function of the signal indicating the rigidity of the shock absorber assembly, and
adjusting the rigidity of the shock absorber assembly as a function of the operating state signal.

9. The method of claim 6, wherein the shock absorber assembly includes a plurality of shock absorber devices and the method includes:
acquiring a plurality of signals indicating a plurality of positions of the shock absorber devices, and
calculating the signal indicating a configuration of the shock absorber assembly as a function of the signals indicating the positions of the shock absorber devices.

10. The method of claim 6, which includes:
acquiring a signal indicating an operator command, and
recalculating the operating state signal as a function of the operator command signal.

* * * * *